United States Patent
Wang

(10) Patent No.: US 9,031,169 B2
(45) Date of Patent: May 12, 2015

(54) SPARSE CHANNEL DETECTION, ESTIMATION, AND FEEDBACK

(71) Applicant: Xiao-an Wang, Allentown, PA (US)

(72) Inventor: Xiao-an Wang, Allentown, PA (US)

( * ) Notice: Subject to any disclaimer, the term of this patent is extended or adjusted under 35 U.S.C. 154(b) by 105 days.

(21) Appl. No.: 13/769,250

(22) Filed: Feb. 15, 2013

(65) Prior Publication Data

US 2014/0233684 A1    Aug. 21, 2014

(51) Int. Cl.
*H04L 27/06* (2006.01)
*H04L 25/02* (2006.01)

(52) U.S. Cl.
CPC .................................. *H04L 25/0204* (2013.01)

(58) Field of Classification Search
CPC .............. H04L 5/0048; H04L 25/0202; H04L 25/0212; H04L 25/03292; H04L 25/024; H04B 7/0619; H04B 7/0626
USPC ................................. 375/316, 340, 343, 346
See application file for complete search history.

(56) References Cited

U.S. PATENT DOCUMENTS

| | | | |
|---|---|---|---|
| 2002/0114269 A1* | 8/2002 | Onggosanusi et al. | 370/208 |
| 2008/0229177 A1* | 9/2008 | Kotecha | 714/776 |
| 2010/0303165 A1* | 12/2010 | Gore et al. | 375/260 |
| 2013/0243046 A1* | 9/2013 | Vetterli et al. | 375/219 |

* cited by examiner

*Primary Examiner* — Vineeta Panwalkar

(57) ABSTRACT

Most wireless channels are sparse, so sparse channel-based methods can be used for channel estimation and feedback with much better estimation accuracy and much lower feedback overhead. However, certain wireless channels can be non-sparse, for which sparse channel-based methods may cause degraded estimation quality and increased feedback overhead. Means of detecting the channel sparseness are described that provide simple and effective channel sparseness indicators and safeguard against the mismatch between non-sparse channels and sparse channel-based methods. Various fallback options can be used under non-sparse channels such that estimation degradation and feedback overhead are both minimized. Fake multipath removal in continuous time-domain parameter extraction, a sparse channel-based method, is also described that further improves estimation quality and reduces feedback overhead.

20 Claims, 2 Drawing Sheets

SPARSE CHANNEL DETECTION, ESTIMATION, AND FEEDBACK

BACKGROUND

1. Field of Application

The following description relates generally to telecommunications systems and wireless communications systems.

2. Prior Art

Cell capacity is a key performance measure in wireless cellular networks. Multipoint broadcasting and spatial multiplexing have the potential to increase cell capacity by multifold, and have been adopted in LTE-A (long-term evolution of 3G, advanced) under the names of co-ordinated multipoint transmission (CoMP) and multi-user MIMO (MU-MIMO), respectively.

To fully realize the benefits of CoMP and MU-MIMO, collaborating base stations must have full downlink channel information, which has to be fed back by mobile users via the uplink. The huge feedback overhead, however, diminished the uplink capacity and made CoMP and MU-MIMO not feasible to implement until recently. Highly efficient channel estimation and feedback schemes based on time-domain parameter (TDP) extraction have recently been proposed, which improve the estimation accuracy and reduce the feedback overhead by one to two orders of magnitude.

TDP extraction takes into account the fact that wireless channels generally consist of sparse multipaths. A sparse channel can be described by a limited number of the TDPs which requires a much smaller amount of data, thereby reducing the channel feedback overhead significantly.

For certain cell terrains, there may exist spots within the cellular coverage area where the wireless channels are not sparse. While such situations may be rare, they nonetheless pose problems for sparse channel-based methods such as TDP extraction. The mismatch between an overly dense channel and a sparse channel-based method degrades estimation quality and increases feedback overhead, which reduces the benefits of CoMP and MU-MIMO and lowers the cell capacity.

Thus methods, apparatus, and systems are needed that detect the sparse channels so that (a) sparse channel-based methods can be reliably and effectively employed whenever possible, (b) the performance degradation due to the mismatch is minimized, and (c) fallback approaches can be used that maximize the estimation and feedback performance and overall cell capacity under non-sparse channels.

SUMMARY

The following is a summary of one or more aspects in order to provide a basic understanding of such aspects. Some concepts of one or more aspects are presented in a simplified form as a prelude to the more detailed descriptions that are to be presented later.

In certain aspects of the subject disclosure, sparse channel detection is performed on the received signal. This ensures the high estimation quality and low feedback overhead when sparse channel-based algorithms are used on channels that are determined to be sparse.

In some further aspects of the subject disclosure, various detection variables can be used for sparse channel detection, including the relative captured channel energy, the relative captured total energy, and the matching error.

In some other aspects of the subject disclosure, continuous TDP (CTDP) extraction is used for channel estimation and feedback. A threshold that depends on the energy of the observation noises is used for fake multipath removal, which further improves the estimation accuracy and reduces the feedback overhead.

In yet other aspects of the subject disclosure, various fallback options for channel estimation and feedback can be selected when the channel is determined to be non-sparse. The information from sparse channel detection can be used for selection of the fallback options. Moreover, the mobile user can signal to the network that the channel is not suitable for feedback due to high feedback overhead. The network can choose to exclude the mobile user from participating CoMP and MU-MIMO by suspending channel feedback and allocate feedback capability to other mobile users. The network can also decide to continue channel feedback if the uplink can support the increased feedback overhead. This allows more efficient utilization of uplink resources and maximization of the benefit of CoMP and MU-MIMO within the network.

Accordingly several advantages are to provide simple and yet effective means for sparse channel detection, to improve channel estimation quality and reduce channel feedback overhead by utilizing sparse channel-based methods whenever possible, and to provide fallback options for non-sparse channels such that maximum estimation accuracy and minimum feedback overhead can be achieved, and such that the overall uplink resource is more efficiently utilized. Still further advantages and novel features will become apparent from the study of the following description and the accompanying drawings.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

As used herein, term "channel feedback" is intended to refer to feedback of the full channel information, i.e., all channel information that is needed for data demodulation, as opposed to feedback of only a few of the channel characteristics such as SNR (signal-to-noise ratio).

Figure 1:
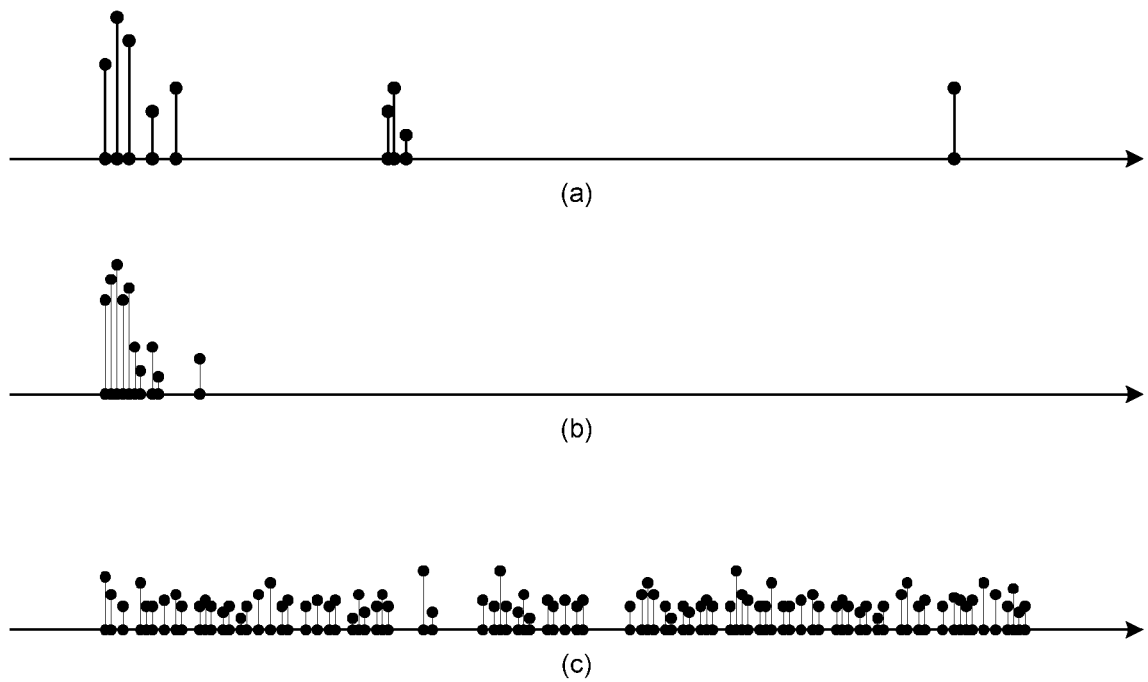
FIG. 1 illustrates sparse and non-sparse channels in the time domain.

Most wireless channels exhibits sparse multipaths, whereas non-sparse channels occasionally occur, which has densely spaced multipaths. FIG. 1 illustrates sparse and non-sparse channels in the time domain. FIG. 1(a) shows an example sparse channel with a long delay spread, FIG. 1(b) shows an example sparse channel with a short delay spread, and FIG. 1(c) shows an example non-sparse channel. In the continuous time domain, the propagation delays of multi-paths may not be some integral multiples of some sampling interval, whereas in the discrete time domain, the channel is characterized by channel taps on an integral grid of a sampling interval. For a sparse channel in the discrete time domain, most of the channel energy is concentrated on a limited number of dominant channel taps.

If the channel is first observed in the frequency domain, such as in orthogonal frequency division multiplexing (OFDM) where the reference signals (RS) for channel estimation are carried on certain OFDM subcarriers, the time-domain channel observations can be derived from the frequency-domain channel observations as follows. The frequency-domain channel observations can be written as $$r = y + u \quad (1)$$

where r, y, and u are all K-dimensional vectors with K being the number of frequency-domain channel observations, r is the vector of frequency-domain channel observations at RS subcarrier frequencies $\omega_k$, k=0, 1, ..., K−1, y is the vector of the channel on RS subcarriers, and u is vector of the observation noises in the frequency domain, with $E\{u^H u\} = KN_0$. Assume that the span of the derived time-domain channel observations is S, then time-domain channel observations s in the sense of least square (LS) are given by $$s = \begin{cases} (F_{RS}^H F_{RS} + \sigma^2 I)^{-1} F_{RS}^H r & S \leq K \\ F_{RS}^H (F_{RS} F_{RS}^H + \sigma^2 I)^{-1} r & S > K \end{cases} \quad (2)$$

where $F_{RS}$ is K×S submatrix of the discrete Fourier transform (DFT) matrix F associated with OFDM symbols. $F_{RS}$ consists of rows corresponding $\omega_k$ and first S columns in F. In Eq. (2), $\sigma^2 \geq 0$. In the case of ill-conditioned $F_{RS}$, $\sigma^2 > 0$ can be used to maintain the numerical stability. Still, for long channels, the matrix inversion in Eq. (2) can be costly in computations. This can be circumvented by choosing $S = N_{DFT}$, where $N_{DFT}$ is the size of the DFT. With $S = N_{DFT}$, $(F_{RS} F_{RS}^H)^{-1} = N_{DFT} I$, and Eq. (2) becomes $$s = \frac{1}{N_{DFT}} F_{RS}^H r = \frac{1}{N_{DFT}} F^H r_{DFT} \quad (3)$$

where $r_{DFT}$ is an $N_{DFT} \times 1$ vector containing all elements of r at the locations of RS subcarriers, and zeros at all other locations. Thus $r_{DFT}$ can be considered as an extension of r, and Eq. (3) shows that s is simply the inverse DFT (IDFT) of $r_{DFT}$ and therefore can be evaluated efficiently.

Eq. (3) gives time-domain channel observations s with span S. Note that span S is chosen for the convenience of deriving time-domain channel observations s, and that not all S channel taps in s are necessarily useful. Typically, the channel length or an upper bound for the channel length can be obtained a priori. For example, in LTE, the RS subcarrier pattern only supports channel length $L < N_{DFT}/3$, so only one third of entries in s need to be considered. Hereinafter, s is assumed to have $L \leq S$ taps, i.e., $s_l = 0$ for $l \geq L$ for the l-th observed channel tap in s.

The time-domain channel observations can be written as $$s_l = h_l + v_l, l = 0, 1, \ldots, L-1 \quad (4)$$

where $h_l$ is the "true" time-domain channel, and $v_l$ is the observation noise in the time domain with $E\{v_l v_l^*\} = V_N$. For sparse channel detection, a strength function $\rho(s_l)$ is associated with observed channel tap $s_l$. The strength function characterizes the "strength" of an observed channel tap. Some example strength functions are given below.

$$\rho(s_l) = |Re\{s_l\}| + |Im\{s_l\}| \quad (5)$$

$$\rho(s_l) = \max(|Re\{s_l\}|, |Im\{s_l\}|) \quad (6)$$

$$\rho(s_l) = Re^2\{s_l\} + Im^2\{s_l\} = s_l s_l^* \quad (7)$$

The strength function in Eq. (7) is the energy of observed channel tap $s_l$. It can be appreciated that other strength functions can be used as well. For two observed channel taps $s_l$ and $s_m$, $s_l$ is said to be stronger than $s_m$ if $\rho(s_l) > \rho(s_m)$.

The energy of the time-domain channel observations can be written as $$E\left\{\sum_{l=0}^{L-1} s_l s_l^*\right\} = \sum_{l=0}^{L-1} h_l h_l^* + E\left\{\sum_{l=0}^{L-1} v_l v_l^*\right\} = V_C + LV_N \quad (8)$$

where $V_C$ is the "true" channel energy. From Eq. (8), $$V_C = E\left\{\sum_{l=0}^{L-1} s_l s_l^*\right\} - LV_N \approx \sum_{l=0}^{L-1} s_l s_l^* - LV_N \quad (9)$$

Let $I_n$ be the index set of the n strongest observed channel taps. Let the detection variable $\lambda$ be the relative channel energy captured by the n strongest observed channel taps. Then $\lambda$ can be approximated as follows:

$$\lambda = \frac{\sum_{l \in I_n} h_l h_l^*}{V_C} \approx \frac{\sum_{l \in I_n} s_l s_l^* - nV_N}{\sum_{l=0}^{L-1} s_l s_l^* - LV_N} \quad (10)$$

Since the energy of a sparse channel is concentrated on a few dominant taps, Eq. (10) can be used for sparse channel detection. For a given n, a detection threshold $\lambda_T$ can be set such that if the detection variable $\lambda \geq \lambda_T$, the channel is declared to be sparse. For example, in a 20-MHz LTE network, a channel can be considered to be sparse if the first 20~40 strongest observed channel taps capture 80%~90% of the channel energy or more. The scope of the subject disclosure, however, is not limited to those example values.

The detection threshold $\lambda_T$ depends on n, and it can also be made to depend on the SNR. Generally speaking, $\lambda_T$ can be lower at lower SNR, since the benefit of capturing more channel energy can be offset by noises.

The detection variable $\lambda$ can also be the relative total energy captured by the n strongest observed channel taps, given as follows:

$$\lambda \approx \frac{\sum_{l \in I_n} s_l s_l^*}{\sum_{l=0}^{L-1} s_l s_l^*} \quad (11)$$

To evaluate Eq. (10), time-domain observation noise energy $V_N$ needs to be estimated. $V_N$ is determined by variance $N_0$ of frequency-domain observation noise u in Eq. (1). If time-domain channel observation s are obtained from Eq. (3), then $$V_N = \frac{KN_0}{N_{DFT}^2} \quad (12)$$

Various algorithms for estimating $N_0$ are available to an OFDM receiver. An example algorithm for estimating $N_0$ is as follows. Assume that the channel remains unchanged over Q OFDM symbols, and let $r_{k,q}$ be the frequency-domain channel observation at RS subcarrier frequency $\omega_k$ in OFDM symbol q. Then $N_0$ can be estimated according to $$N_0 \approx \frac{1}{K}\sum_{k=0}^{K-1}\frac{1}{Q-1}\left[\sum_{q=0}^{Q-1} r_{k,q}r_{k,q}^* - \frac{1}{Q}\left(\sum_{q=0}^{Q-1} r_{k,q}\right)\left(\sum_{q=0}^{Q-1} r_{k,q}^*\right)\right] \quad (13)$$

Time-domain observation noise energy $V_N$ can also be estimated from observed channel taps $s_l$. Assume that the P least strong observed channel taps contain no or negligible channel energy, then $V_N$ can be estimated according to $$V_N \approx \frac{s_{L-P}s_{L-P}^*}{\ln[L/(L-P)]} \quad (14)$$

The estimate of $V_N$ in Eq. (14) is based on the distribution function of the time-domain observation noise, and thus is referred to as the distribution function method. Note that the estimation accuracy depends on the choice of P.

If a channel is determined to be sparse, sparse channel-based methods are available. A sparse channel-based method uses a time-domain channel model for channel estimation and feedback. A time-domain channel model for a sparse channel can be described by a limited number of the TDPs. Thus estimating the entire channel is reduced to estimating the TDPs. The channel reconstructed from the estimated TDPs is then the estimated channel. The estimated TDPs, instead of the entire channel, are then fed back.

Methods of channel estimation and feedback that do not depend on the sparseness of the channel will be referred to as "conventional" methods hereinafter. Conventional methods for channel estimation include generating the frequency-domain channel observations at the RS subcarrier frequencies in an OFDM system. Conventional methods for channel feedback include feeding back all frequency-domain channel observations at the RS subcarrier frequencies in an OFDM system.

Sparse channel-based methods include continuous time-domain parameter (CTDP) extraction and discrete time-domain parameter (DTDP) extraction. CTDP extraction chooses parameters M, $\alpha_0, \ldots, \alpha_{M-1}$, and $\tau_0, \ldots, \tau_{M-1}$ in the following time-domain channel model:

$$h(t) = \sum_{m=0}^{M-1} \alpha_m \delta(t - \tau_m) \quad (15)$$

to minimize or approximately minimize the following matching error:

$$J(L, \alpha_0, \ldots, \alpha_{M-1}, \tau_0, \ldots, \tau_{M-1}) = \sum_{k=0}^{K-1}\left|\sum_{m=0}^{M-1}\alpha_m e^{-j\omega_k \tau_m} - r_k\right|^2 \quad (16)$$

where $r_k$ is the k-th component of r.

In the time-domain channel model in Eq. (15), M is the number of multipaths, $\alpha_m$ and $\tau_m$ are the complex amplitude and the propagation delay of multipath m, respectively. M, $\alpha_0, \ldots, \alpha_{M-1}$, and $\tau_0, \ldots, \tau_{M-1}$ are then the TDPs in CTDP extraction. To reduce the computation complexity, the minimization of Eq. (16) can be replaced by recursive minimization of the following:

$$J_m(\alpha_m, \tau_m \mid \alpha_0, \ldots, \alpha_{m-1}, \tau_0, \ldots, \tau_{m-1}) = \quad (17)$$

$$\sum_{k=0}^{K-1}|\alpha_m e^{-j\omega_k \tau_m} + \varepsilon_{m-1,k}|^2$$

where $J_m(\alpha_m, \tau_m \mid \alpha_0, \ldots, \alpha_{m-1}, \tau_0, \ldots, \tau_{m-1})$ is referred to as the matching error at iteration m, and $$\varepsilon_{m-1,k} = \sum_{p=0}^{m-1} \alpha_p e^{-j\omega_k \tau_p} - r_k, \quad (18)$$

$$\varepsilon_{-1,k} = -r_k$$

is referred to as the mismatch at recursion m−1. The recursive minimization in Eq. (17) seeks the minimum over $\alpha_m$, and $\tau_m$, given $\alpha_0, \ldots, \alpha_{m-1}$ and $\tau_0, \ldots, \tau_{m-1}$ from previous recursions.

The values of $\tau_m$ and $\alpha_m$ that minimize Eq. (17) are as follows:

$$\tau_m = \underset{\tau}{\operatorname{argmax}}\left|\sum_{k=0}^{K-1}\varepsilon_{m-1,k}e^{j\omega_k \tau}\right|^2 \quad (19)$$

$$\alpha_m = -\frac{1}{K}\sum_{k=0}^{K-1}\varepsilon_{m-1,k}e^{j\omega_k \tau_m} \quad (20)$$

The recursion continues until a predetermined number of recursions has been reached. In the presence of time-domain observation noise $v_l$, however, some of the detected multipaths may be "fake" multipaths, i.e., they are contributed mostly by noise. It is desirable to remove the fake multipaths since (i) fake multipaths degrade the channel estimation accuracy, and (ii) fake multipaths increase the channel feedback overhead. One way to remove the fake multipath is to compare the energy of a detected multipath against a fake multipath threshold T that depends on the energy of the time-domain or frequency-domain observation noises. For example, for detected multipath m, if $$\alpha_m \alpha_m^* < T = cN_0 \quad (21)$$

then detected multipath m is declared to be fake, and the recursion stops and outputs the propagation delays and amplitudes of previously detected m−1 multipaths. The constant c in Eq. (21) may vary with the applications. An example range of c is 0.02~0.05 for a 20-MHz LTE network, although other values of c may also be applicable to LTE and other applications.

In one recursion, one multipath can be detected by setting its propagation delay to be the location of the maximum in Eq. (19), and by calculating its amplitude according to Eq. (20). To reduce the number of recursions, several multipaths can be detected in one recursion as follows.

Assume that m multipaths have been detected from previous recursions. Let $$f(\tau) = \left| \sum_{k=0}^{K-1} \varepsilon_{m,k} e^{j\omega_k \tau} \right|^2 \quad (22)$$

Assume also that p local maxima of $f(\tau)$ have been determined, and choose the delays $\tau_m, \ldots, \tau_{m+p-1}$ of the new p multipaths to be the locations of the p local maxima. The amplitudes of those p multipaths are given by $$\alpha_{[m:m+p-1]} = (E_{[m:m+p-1]}^H E_{[m:m+p-1]})^{-1} E_{[m:m+p-1]}^H \epsilon_m \quad (23)$$

where $\alpha_{[m:m+p-1]} = [\alpha_m, \ldots, \alpha_{m+p-1}]^T$, $E_{[m:m+p-1]}$ is a K+p matrix whose (k,l)-th entry is $\exp(j\omega_k \tau_{m+l})$, and $\epsilon_m = [\epsilon_{m,0}, \ldots, \epsilon_{m,K-1}]^T$. Note that the p local maxima can be chosen according to various criteria. For example, consider p=2. The two local maxima can be the two largest ones, or can be the ones with largest distance between them, or the two largest ones the distance between which is no shorter than a predetermined value.

At the end of the recursions, the amplitudes of the detected multipaths is further refined given the propagation delays of the detected multipaths. Assume that there are M detected multipaths. Then the refined multipath amplitudes are given by $$\alpha = (E^H E + \sigma^2 I)^{-1} E^H r \quad (24)$$

where $\alpha = [\alpha_0, \ldots, \alpha_{M-1}]^T$, $\sigma^2 \geq 0$, and E is a K×M matrix whose (k,m)-th entry is $\exp(j\omega_k \tau_m)$. The matching error after the refinement is given by $$J = (E\alpha - r)^H (E\alpha - r) + \sigma^2 \alpha^H \alpha \quad (25)$$

The extracted TDPs in CTDP extraction are the number, the amplitudes, and the propagation delays of detected multipaths, which can be used to reconstruct the channel according to Eq. (15). The reconstructed channel is then the estimated channel by CTDP extraction.

The extracted TDPs can also be used as the initial guesses to minimize Eq. (16). To distinguish from the recursive minimization of Eq. (17), minimization of Eq. (16) is referred to as full minimization.

If CTDP extraction works as desired on a sparse channel, then the expected value of the matching error should be slightly smaller than the total energy of the time-domain or frequency-domain observation noises, which is $KN_0$ for the frequency-domain observations in Eq. (1). If the channel is non-sparse such that the performance of CTDP extraction is degraded, then the matching error in Eq. (25) will be noticeably higher than the total energy of the time-domain or frequency-domain observation noises. Thus matching error J in Eq. (25) can be used as a detection variable for sparse channel detection. For example, consider the channel observations in an OFDM system in Eq. (1). If detection variable $J > aKN_0$, then the channel can be declared to be non-sparse. An example range for constant a in detection threshold $aKN_0$ is a=1.2~1.5. However, other values of a can also be used within the scope of the subject disclosure.

It is to be understood and appreciated that use of the matching error for sparse channel detection is applicable to both CTDP extraction and DTDP extraction. It is also to be appreciated that more than one detection variable can be used for sparse channel detection.

After a sparse channel-based method completes channel estimation, the extracted TDPs are used for channel feedback. For DTDP extraction, the TDPs are the number, the amplitudes, and the indices of the dominant channel taps. A base station will reconstruct the downlink channel from the TDPs received from the feedback via the uplink.

If the channel is detected to be non-sparse, fallback options can be used for channel estimation and feedback. Consider channel estimation first. If the detection variable differs from the detection threshold only by a small amount, which indicates that the channel is "lightly" non-sparse, then it is likely that the estimation accuracy of the sparse channel-based method, which may have degraded under non-sparse channels, is still better than that of the conventional method. Thus the first fallback option is to continue using the sparse channel-based method as if the channel were sparse. The second fallback option is to use the sparse channel-based method with more TDPs to compensate the loss of accuracy. For example, CTDP extraction can be used with more multipaths, or DTDP extraction can be used with more dominant channel taps.

If the detection variable differs from the detection threshold by a large amount, even with increased number of the TDPs, which indicates that the channel is "heavily" non-sparse or very dense, then using a conventional method instead of a sparse channel-based method can be the third fallback option, since the former may have better estimation accuracy than the latter under very dense channels such as the one in FIG. 1(c). One way to decide whether to use the third fallback option or not is to run both methods and compare the respective matching errors.

Next consider channel feedback. If the detection variable differs from the detection threshold only by a small amount, then the TDPs from the first fallback option can be used for feedback. If increased feedback overhead is allowed by the uplink, the second fallback option can also be used. If the detection variable differs from the detection threshold by a large amount, and the feedback overhead is large for a given channel reconstruction accuracy, the mobile user can use the fourth fallback option: to signal the network that the channel is not suitable for feedback due to the high feedback overhead. The network can decide to exclude the mobile user under the non-sparse channel from participating CoMP and MU-MIMO by suspending channel feedback from the mobile user, and allocate feedback capability to other mobile users so that the uplink resources are better utilized. The network can also choose to allow the mobile user to continue channel feedback if it determines that the uplink can support large feedback overhead without sacrificing the useful uplink traffic.

It is to be understood and appreciated that channel estimation and channel feedback may use different fallback options. It is also to be understood that in some applications, the choice of the fallback options may also depend on the complexity of computation and/or implementation.

Figure 2:
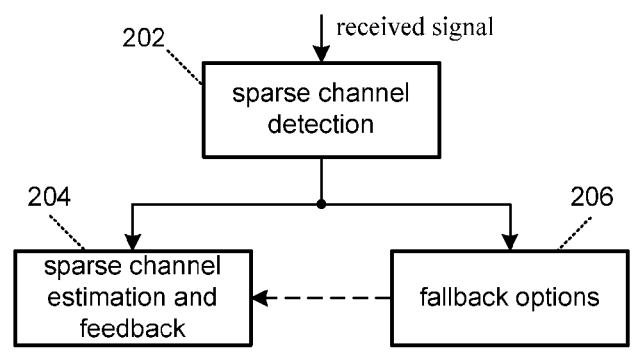
FIG. 2 illustrates an exemplary diagram of sparse channel detection, estimation and feedback.

FIG. 2 illustrates an exemplary diagram of sparse channel detection, estimation, and feedback. Sparse channel detection apparatus 202 detects the sparseness of the channel from the received signal. Sparse channel detection apparatus 202 can use the relative captured channel energy, or the relative captured total energy, or the matching error to detect the sparseness of the channel.

If the channel is determined to be sparse, sparse channel estimation and feedback apparatus 204 will use a sparse channel-based method such as CTDP extraction or DTDP extraction. If the channel is estimated by CTDP extraction or DTDP extraction, the feedback data will be the extracted TDPs. The extracted TDPs can also be compressed by data compression algorithms prior to feedback.

If the channel is determined to be non-sparse, fallback options apparatus 206 selects from various afore-mentioned fallback options for channel estimation and feedback. The selection can be based on the values of detection variables, and/or the performance measures such as the channel estimation accuracy, channel reconstruction accuracy, and feedback overhead, of a sparse channel-based method and/or a conventional method. The dashed line between fallback options apparatus 206 and sparse channel estimation and feedback apparatus 204 indicates that fallback options apparatus 206 may still choose to use a sparse channel-based method. The channel feedback option in fallback options apparatus 206 can also be decided by the signaling between the mobile user and the network.

Figure 3:
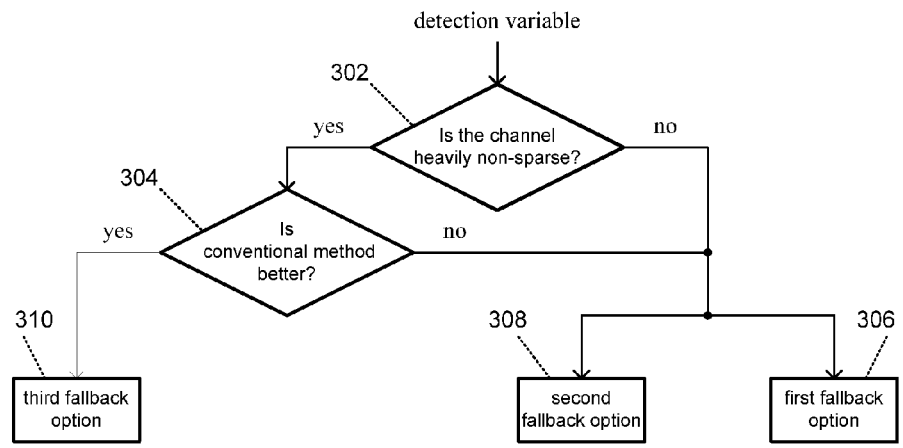
FIG. 3 illustrates an example flow chart of choosing fallback options for channel estimation.

FIG. 3 illustrates an example flow chart of choosing fallback options for channel estimation. Step 302 examines the detection variable and decides if the channel is lightly non-sparse or heavily non-sparse. If the channel is lightly non-sparse, either step 306, the first fallback option, or step 308, the second fallback option, may be taken. If the channel is heavily non-sparse, step 304 checks if the conventional method yield better estimation accuracy. If the conventional method is better, step 310, the third fallback option, is taken. Otherwise, either step 306 or step 308 may be taken.

Figure 4:
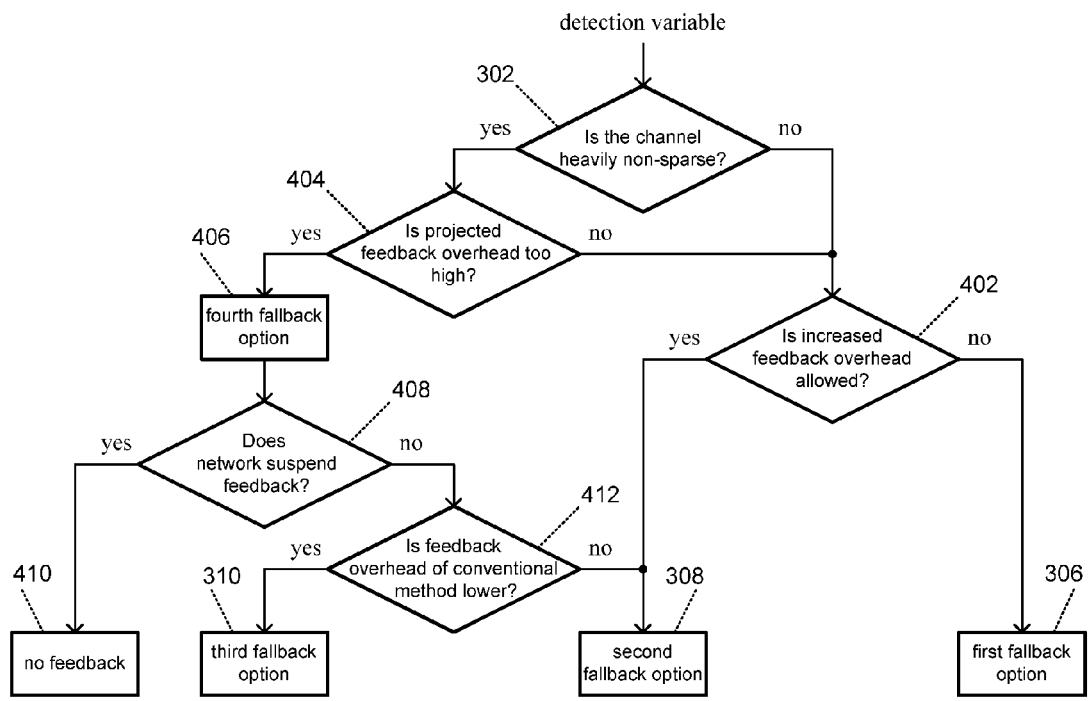
FIG. 4 illustrates an example flow chart of choosing fallback options for channel feedback.

FIG. 4 illustrates an example flow chart of choosing fallback options for channel feedback. Step 302 examines the detection variable and decides if the channel is lightly non-sparse or heavily non-sparse. If the channel is lightly non-sparse, step 402 checks if increased feedback overhead is allowed. If the feedback overhead is not allowed to increase, step 306 is taken. Otherwise, step 308 is taken to improve the accuracy of channel reconstruction at the base station. If the channel is heavily non-sparse, step 404 checks if the projected feedback overhead, by the sparse channel-based method or by the conventional method, is too high. If the projected feedback overhead is not too high, the fallback option selection process goes back to step 402 and the steps that follow. If the projected feedback overhead is determined to be too high, step 406, the fourth fallback option, is taken, which signals the network that the feedback overhead is too high. The projected feedback overhead can be part of the signaling. Step 408 checks the response from the network. If the network suspends channel feedback, step 410 is taken, i.e., no channel feedback is performed. Otherwise step 412 is taken, which checks whether the conventional method has a lower feedback overhead. If the conventional method has a lower feedback overhead, step 310 is taken. Otherwise step 308 is taken.

It is to be appreciated that in FIG. 3 and FIG. 4, step 302 can use more than one detection variable to determine if the channel is lightly non-sparse or heavily non-sparse. It is also to be understood that when the network suspends the channel feedback and the mobile user performs no channel feedback, it means that the "full" channel feedback, i.e., the feedback of the complete channel information, is suspended. It does not preclude certain channel characteristics such as SNR from being fed back, as used in existing communications systems including wireless networks.

CONCLUSION, RAMIFICATIONS, AND SCOPE

Accordingly it will be seen that sparse channel detection provides an effective means of switching between the sparse channel-based methods and the conventional methods to achieve the best possible estimation accuracy and lowest possible feedback overhead. With the help of various fallback options, sparse channel detection minimizes the performance degradation and uplink congestion due to the mismatch between the channel and the methods for channel estimation and feedback. The signaling on the feedback overhead between the mobile user and network allows the network to maximize the benefits of CoMP and MU-MIMO without overburdening the uplink.

Various aspects of the subject disclosure are described with a scalar channel, i.e., the channel between a single transmitter and a single receiver. It is to be understood and appreciated that the principles of the subject disclosure also apply to vector and matrix channels, such as the multipoint-broadcasting channels and MIMO channels.

Various aspects of the subject disclosure are described with LTE cellular networks. It is to be understood and appreciated that the principles of the subject disclosure also apply to other wireless networks and systems, such as wireless local area network (WLAN).

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for channel estimation in a wireless network with at least one receive antenna, comprising:
   (a) computing a detection variable from a signal from said receive antenna, said detection variable depending upon channel energy distribution or matching error,
   (b) detecting the sparseness of a channel from which said received signal is received based on said detection variable or plurality of detection variables, and
   (c) estimating said channel with a sparse channel-based method if said channel is detected to be a sparse channel, said sparse channel-based method consisting of estimating a set of time-domain parameters, and estimating said channel with a fallback option if said channel is detected to be a non-sparse channel.

2. The method of claim 1, wherein computing said detection variable or said plurality of said detection variables further comprises:
   (a) extending a vector of frequency-domain channel observations to an extended vector of a predetermined length of inverse discrete Fourier transform, and
   (b) transforming said extended vector into a vector of time-domain channel observations, also referred to as a vector of observed channel taps, by inverse discrete Fourier transform.

3. The method of claim 2, wherein extending said vector of frequency-domain channel observations further comprises filling zeros in the locations where no frequency-domain channel observations are made.

4. The method of claim 1, wherein said detection variable is one of the following:
   (a) relative channel energy captured by a predetermined number of strongest observed channel taps, (b) relative total energy captured by a predetermined number of strongest observed channel taps, and
(c) matching error.

5. The method of claim 1, wherein detecting said sparseness of said channel further comprises comparing said detection variable with the predetermined detection threshold.

6. The method of claim 1, further comprising estimating the time-domain observation noise energy by estimating the variance of frequency-domain channel observation noises.

7. The method of claim 6, further comprising estimating said time-domain observation noise energy by the distribution function method.

8. The method of claim 1, wherein said sparse channel-based method is continuous time-domain parameter extraction.

9. The method of claim 1, wherein said sparse channel-based method is discrete time-domain parameter extraction.

10. The method of claim 1, wherein said fallback option is one of the following:
(a) said sparse channel-based method with the same set of time-domain parameters as used for said sparse channel,
(b) said sparse channel-based method with increased number of said time-domain parameters, and
(c) a conventional method for channel estimation.

11. A method for channel feedback in a wireless network with at least one receive antenna, comprising:
(a) computing a detection variable from a signal from said receive antenna, said detection variable depending upon channel energy distribution or matching error,
(b) detecting the sparseness of a channel from which said received signal is received based on said detection variable or plurality of detection variables, and
(c) performing channel feedback with a sparse channel-based method if said channel is detected to be a sparse channel, said sparse channel-based method consisting of feeding and B back a set of time-domain parameters, and performing channel feedback with a fallback option if said channel is detected to be a non-sparse channel.

12. The method of claim 11, wherein performing channel feedback with said sparse channel-based method further comprises:
(a) extracting the time-domain parameters of said sparse channel, and
(b) feeding back the extracted time-domain parameters.

13. The method of claim 12, wherein feeding back said extracted time-domain parameters further comprises compressing said extracted time-domain parameters with data compression techniques.

14. The method of claim 11, wherein said fallback option is one of the following:
(a) said sparse channel-based method with the same set of said time-domain parameters as used for said sparse channel,
(b) said sparse channel-based method with increased number of said time-domain parameters, and
(c) interacting with said network via a signaling procedure.

15. The method of claim 14, wherein interacting with said network via said signaling procedure further comprises:
(a) notifying said network of high feedback overhead,
(b) checking the response from said network, and
(c) suspending channel feedback if said response from said network requests that channel feedback be suspended, or continuing channel feedback with one of the following if said response from said network allows channel feedback:
(i) said sparse channel-based method with the same set of said time-domain parameters as used for said sparse channel,
(ii) said sparse channel-based method with increased number of said time-domain parameters, and
(iii) a conventional method for channel feedback.

16. A method for extracting time-domain parameters of a channel, comprising:
(a) generating a set of channel observations from a pilot signal in a received signal,
(b) forming a matching error between said channel observations and a time-domain channel model, said time-domain channel model being defined by a set of time-domain parameters, said time-domain parameters comprising the number of multipaths, the complex amplitudes and the propagation delays of said multipaths,
(c) detecting one or more said multipaths, and determining said complex amplitude(s) and said propagation delay(s) of the detected multipath(s) by minimizing said matching error recursively,
(d) performing fake multipath detection on each said detected multipath, and removing said detected multipath if said detected multipath is detected to be a fake multipath,
(e) repeating steps (c) and (d) until said fake multipath is detected and removed, or until a predetermined number of recursions has been reached, or until a predetermined number of multipaths have been detected, and
(f) refining said complex amplitudes of all said detected multipaths that are not fake multipaths by minimizing said matching error given said propagation delays of said detected multipaths,
whereby the number of said detected multipaths, the refined complex amplitudes of said detected multipaths, and said propagation delays of said detected multipaths are extracted time-domain parameters.

17. The method of claim 16, wherein performing fake multipath detection on said detected multipath further comprises:
(a) computing the energy of said detected multipath,
(b) comparing said energy against a fake multipath threshold, said fake multipath threshold being proportional to the energy of the time-domain or frequency-domain observation noises, and
(c) designating said detected multipath as fake multipath if said energy is less than said fake multipath threshold.

18. The method of claim 16, further comprising reconstructing said channel with said extracted time-domain parameters, whereby the reconstructed channel can be used as channel estimation.

19. The method of claim 16, further comprising performing channel feedback by feeding back said extracted time-domain parameters.

20. The method of claim 16, further comprising using said extracted time-domain parameters as initial guesses to solve the full minimization of said matching error, whereby the solution to said full minimization is a refined version of said extracted time-domain parameters.

* * * * *